United States Patent

[11] 3,597,676

| [72] | Inventor | Alvin G. Moore<br>Cumberland, Md. |
|---|---|---|
| [21] | Appl. No. | 830,825 |
| [22] | Filed | June 5, 1969 |
| [45] | Patented | Aug. 3, 1971 |
| [73] | Assignee | Hercules Incorporated<br>Wilmington, Del.<br>Continuation-in-part of application Ser. No. 632,239, Apr. 20, 1967, now Patent No. 3,500,691. |

[54] THERMISTOR CIRCUIT FOR USE IN AN ANGULAR MOVEMENT SENSING DEVICE
3 Claims, 3 Drawing Figs.

| [52] | U.S. Cl. | 323/20,<br>73/204, 73/342, 73/362, 323/40, 323/68, 323/75 |
|---|---|---|
| [51] | Int. Cl. | G05f 1/58 |
| [50] | Field of Search | 323/4, 9,<br>16—22, 39, 40, 65, 68, 69, 75 A, 75 E, 75 N;<br>73/204, 342, 362 R; 340/233 |

[56] References Cited
UNITED STATES PATENTS

| 2,859,402 | 11/1958 | Schaeve | 323/65 |
|---|---|---|---|
| 3,126,508 | 3/1964 | Eriksson et al. | 323/69 |
| 3,388,316 | 6/1968 | Gately | 323/9 |

Primary Examiner—J. D. Miller
Assistant Examiner—G. Goldberg
Attorney—William F. Smith

ABSTRACT: A circuit for measuring the difference in cooling imposed upon two thermistors, which circuit is particularly adapted for use in a sensing device wherein a fluid jet is deflected relative to the thermistors in response to angular movement, and comprises a bridge for electrically heating each thermistor and thus lowering its resistance until the bridge is balanced, and a difference in the power consumption required to maintain each thermistor at its equilibrium temperature is an indication of the unequal cooling imposed upon the thermistors, which, in a fluid-jet-type angular rate sensor, is an indication of the deflection of the fluid jet from a centered condition relative to the jets which is in turn an indication of the rate and direction of angular movement.

PATENTED AUG 3 1971   3,597,676

ALVIN G. MOORE
INVENTOR

BY William J. Smith

AGENT

THERMISTOR CIRCUIT FOR USE IN AN ANGULAR MOVEMENT SENSING DEVICE

This application is a continuation-in-part of my prior application Ser. No. 632,239, now U.S. Pat. No. 3,500,691 filed Apr. 20, 1967, and relates to the thermistor circuit which constitutes a part of the sensing means of the angular movement sensing device forming the subject matter of that application, which circuit was the subject of a requirement for restriction in that application.

More particularly, the present invention relates to a circuit for heating and thereby adjusting the resistance of a pair of thermistors such as those in the fluid-jet-type angular movement sensing device forming the subject of application Ser. No. 632,239, which circuit is highly sensitive to minute variations in the cooling effect imposed upon the thermistors and has improved responsiveness or a minimum of lag or delay between an increment of turn and the response thereto by the unit.

The above objects have been attained in accordance with this invention by wiring a pair of thermistors into individual bridge circuits in which the thermistors are electrically heated to a temperature at which the resistance of the thermistors, which vary inversely with temperature, effect a balance or equilibrium in the bridge circuit. The electrical power required to maintain the thermistors at their equilibrium temperature is a function of the cooling imposed upon the thermistors, which is itself a function of the centered condition of the fluid jet relative to the thermistors. The deflection of the jet from the centered condition relative to the thermistors is in turn a function of the angular movement imposed upon the unit so that the power consumption thus provides an indication of the rate and the direction of the angular movement.

A preferred embodiment of the invention is hereinafter described with reference to the accompanying drawings, in which.

Figure 1:
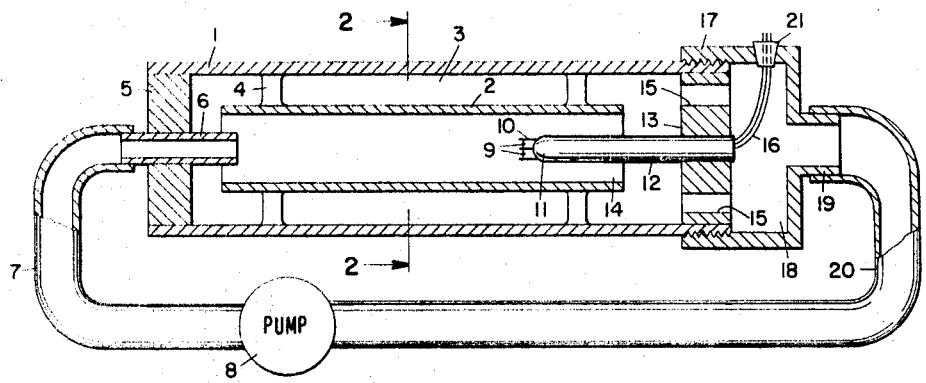
FIG. 1 is a schematic illustration in section of a unit with which the circuit of this invention is adapted to be used.
Figure 2:
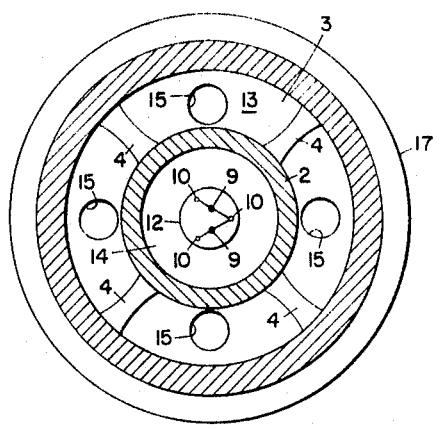
FIG. 2 is a sectional view taken substantially on the line 2-2 of FIG. 1.

With reference to the drawings, FIGS. 1 and 2, there is illustrated an angular rate sensor of the fluid jet type in which there is provided an outer or housing sleeve 1 having a jet-enclosing or sensor sleeve 2 disposed internally of and coaxial with the housing 1, and disposed in spaced relation thereto to provide an annular space 3 between the same. The sensor sleeve 2 may be supported for example by means of braces 4 as shown.

The housing sleeve 1 is closed at one end by a plug 5 having an axial bore in which is secured a nozzle 6. The nozzle 6 is aligned coaxially with the sensor sleeve 2 and is designed to discharge a jet of fluid into the sensor sleeve 2 at its input end externally of the housing sleeve 1, the nozzle 6 is connected by a conduit 7 with the output of a pump 8.

At the end of the sensor sleeve 2 opposite from the nozzle 6 there is mounted what is herein termed the sensing means, that is, the means upon which the fluid jet discharged from the nozzle 6 impinges. In the usual manner with fluid-jet-type angular movement sensing devices, the response is generated by movement of the sensing means relative to the discharge end of the nozzle 6 during the period of time that an increment of fluid is in transit from the nozzle 6 to the sensing means. This relative motion is manifested by an impingement of that increment of fluid in a nonsymmetrical manner upon the sensing means. The amount of displacement of the fluid jet relative to the sensing means is proportional to the angular rate of movement and the device can accordingly be calibrated to indicate angular rate of movement.

The sensing means in accordance with the embodiment of the invention illustrated in FIGS. 1 and 2 comprises a pair of thermistors 9 carried by posts 10 at the free end 11 of a support 12. The support 12 is mounted in a plug 13 that closes the end of the housing sleeve 1 opposite from the plug 5 and is arranged substantially coaxially of the sensor sleeve 2 with its free end 11 extending into the sleeve 2. The free end 11 is preferably rounded to provide for a smooth flow of the jet thereover while the support 12 itself is sufficiently smaller in cross section than the inner diameter of the housing sleeve 1 to provide an annular space 14 between the two. There are exhaust ports 15 in the plug 13 to provide for escape from the housing sleeve 1 of the fluid delivered by the nozzle 6. The thermistors 9 are adapted to be heated by electrical power supplied through leads 16 that extend through the support 12 to the posts 10.

In order to provide a close system in the illustrated device, the end of the housing sleeve 1 adjacent to the plug 13 may be closed by a cap 17 having an end wall that is spaced from the plug 13 and defines with the plug 13 a fluid chamber 18 that collects the exhaust fluid from the ports 15 and is connected by a coupling 19 and a conduit 20 to the intake of the pump 8. The leads 16 in this case may be directed outwardly of the chamber 18 through an insulating plug 21 that seals the aperture in the cap 17 through which the leads 16 are run.

In the normal operation of the device as illustrated in FIGS. 1 and 2, the pump 8 supplies fluid under pressure through the conduit 7 to the nozzle 6 from which it is discharged as a fluid stream. The fluid stream passes through the sensor sleeve 2 and impinges upon the thermistors 9 with the nozzle 6 being arranged relative to the thermistors so that the fluid stream is directed symmetrically upon the thermistors in the at rest state of the device. As hereinafter more fully discussed in reference to the circuit of FIG. 3, with the stream impinging equally upon the two thermistors and producing an equal cooling of the same, the heating circuits for the thermistors are in equilibrium and are balanced.

Upon an angular movement of the device, the fluid stream is deflected to a nonsymmetrical impingement upon the two thermistors and produces an unequal cooling of them as the thermistors are cooled, their electrical resistance increases and their heating circuits are thus thrown out of balance. A measurement of the unequal power required to maintain the two thermistors at equilibrium temperature indicates the amount of deflection of the jet and, through the proportional relation of the deflection of the jet to the rate of angular movement, also indicates the rate of angular movement. The direction of angular movement is indicated by the relative cooling of the two thermistors, that is, increased cooling of the one bead indicates angular movement in the plane of sensitivity in the direction of the opposite bead.

Figure 3:
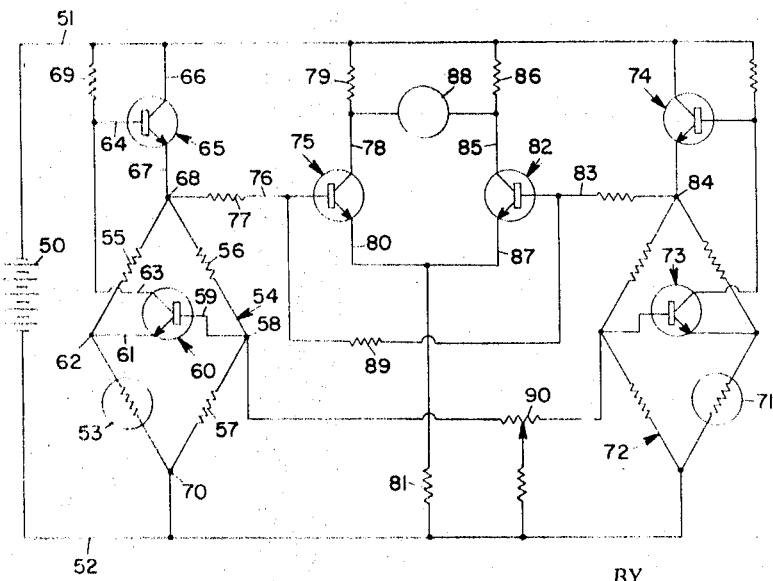
FIG. 3 is a circuit diagram of an electrical circuit in accordance with this invention.

In FIG. 3 there is illustrated schematically the electrical circuit for heating the thermistors 9 and for indicating the direction and rate of angular movement. In the illustrated circuit, the battery 50 represents a source of electrical powers, that is supplied to the circuit through a power lead 51 and a ground lead 52. On of the thermistors 9 is illustrated at 53 at the left in FIG. 3. The thermistor 53 is connected in one leg of a bridge 54 along with a resistor 55. The other leg of the bridge 54 consists of two resistors 56 and 57 that correspond respectively to the resistors 55 and the thermistor 53. The bridge terminal 58 between the resistors 56 and 57 is connected to the base lead 59 of a control transistor 60 while the emitter lead 61 thereof is connected to the bridge terminal 62 between the thermistor 53 and resistor 55. The collector lead 63 of the transistor 60 is connected to the base lead 64 of a power transistor 65 which has its collector lead 66 connected to the power lead 51 and its emitter lead 67 connected to the input terminal 68 of the bridge 54. The collector lead 63 of the control transistor 60 and the base lead 64 of the power transistor 65 are connected to the power lead 51 through a resistor 69. The output terminal 70 of the bridge 54 is connected to the ground lead 52.

At the opposite side of the circuit, there is illustrated at 71 the second of the thermistors 9, which thermistor 71 is connected in a circuit comparable to the circuit in which the thermistor 53 is connected, which circuit includes a bridge 72, a control transistor 73 and a power transistor 74. Inasmuch as the connections and the function and operation of the circuit for the thermistor 71 is the same as that of the thermistor 53, the above description of the connections and the following description of the function and operation of the circuit for the thermistor 53 will also serve as descriptions applicable to the thermistor 71.

In operation, electrical power is supplied from the power lead 51 through the resistor 69 to the base lead 64 of the power transistor 65 so that the transistor 65 then begins to conduct and voltage is applied to the input terminal 68 of the bridge 54. At this time, since the thermistor 53 is cold and therefore has a relatively high resistance, the base voltage on the control transistor 60 is less than the voltage at the emitter lead 61 and bridge terminal 62 so that the transistor 60 is not conducting. With power in the bridge 54, the thermistor 53 begins to heat and its resistance begins to fall. As the current in the thermistor leg of the bridge 54 thus increases, the voltage drop across the resistor 55 increases until the voltage at the bridge terminal 62, together with the voltage drop, if any, across the control transistor 60, is equal to the voltage at the bridge terminal 58. At this point, the control transistor 60 begins to conduct and to lower the voltage on the base 64 of the power transistor 65. The power supplied from the power lead 51 through the collector and emitter of the transistor 65 to the input terminal 68 of the bridge 54, is thus reduced until an equilibrium is established, that is, until the current in the thermistor leg of the bridge 54 is adequate only to generate heat in the thermistor at a rate that matches the rate at which the heat is dissipated from the thermistor so that the thermistor 53 will remain at a constant temperature and thus a constant resistance. The bridge circuit 54 is thus balanced and will remain in balance so long as the cooling imposed upon the thermistor is not changed.

With the bridge 54 in equilibrium, when the jet impinging upon the thermistor 53 shifts in a direction to increase the rate at which heat is dissipated from the thermistor, the thermistor tends to cool and thus to increase in resistance. The current in the respective leg of the bridge 54 is thus reduced with a corresponding increase in voltage at the bridge terminal 62. As the emitter voltage at the control transistor 60 is thus increased, the control current is reduced and the voltage at the base lead 64 of the power transistor 65 is increased, whereby the voltage is raised at the input terminal 68 of the bridge 54 and there is a corresponding increase of the voltage at the bridge terminals 58 and 62 and of the current flow in the bridge. The power supplied to the thermistor 53 and the resulting heat are thus increased to reestablish the equilibrium temperature of the thermistor at the new and increased heat dissipation rate. When the jet impinging upon the thermistor 53 shifts in the direction to decrease the rate at which heat is dissipated from the thermistor 53, the circuit has an opposite reaction.

The output of the device, which may be by way of a meter or a directly usable control signal, is taken by comparing the voltage at the input terminal 68 of the bridge 54 with that at the corresponding terminal of the bridge 72. As illustrated, this may be accomplished through an output transistor 75 having a base lead 76 connected through a resistor 77 to the input terminal 68 of the bridge 54. The collector lead 78 of the transistor 75 is connected to the power lead 51 through a resistor 79 while the emitter lead 80 is connected to the ground lead 52 through a resistor 81. The input terminal 84 of the bridge 72 is also connected to a comparable output transistor 82 at the base lead 83 thereof, which transistor 82 has its collector lead 85 connected to the power lead 51 through a resistor 86 and its emitter lead 87 connected to the power lead 52 through the resistor 81. The output, indicated at 88, is connected across the collector leads 78 and 85 of the transistors 75 and 82.

To establish the range of the circuit, that is, to control the output signal obtained with respect to a given variation in the voltage at the input terminals of the bridges 54 and 72, there may be provided a resistor 89 connected at its opposite ends to the base leads 77 and 83 of the output transistors 75 and 82.

Zero adjustment of the output 88, that is, to balance the voltage across the output 88 when the jet is centered relative to the thermistors, there is provided an adjustable resistor 90 that is adapted to adjust the voltage at the bridge terminals connected to the base of the control transistors, that is, the terminal 58 and the corresponding terminal of the bridge 72.

As more fully disclosed in the above mentioned prior application, the fluid pressure and the diameter of the nozzle 6 are selected to provide laminar flow of the jet discharged by the nozzle, which in turn produces a linear response at the thermistors 9. The thermistors are also spaced apart and located a distance from the nozzle 6 so that they are positioned on opposite sides of the centerline of the jet with each in the range where the cooling effect of the jet varies substantially linearly, and where a particular angular movement of the unit will provide a desired deflection of the jet relative to the thermistors.

In the circuit in accordance with this invention, the thermistors are positively heated to an equilibrium temperature, which results in a very short response time, that is, the interval between the time the jet is deflected and the time the signal indicating the deflection is obtained. Typically, with the present circuit, this interval may be 0.025 of a second.

What I claim and desire to protect by Letters Patent is:

1. A device for measuring the difference in the cooling imposed upon two thermistors comprising a bridge circuit for each of said thermistors with each thermistor connected between one of the bridge terminals and the output terminal in one leg of the respective bridge and heated by current in said leg of the bridge whereby the temperature and thus the resistance of the respective thermistor is varied upon changes in the cooling imposed thereon and the voltage at the bridge terminal in said one leg of the bridge is correspondingly varied, means for comparing the voltage at the bridge terminals of each bridge and for controlling the voltage applied at the input of said bridges in response to a voltage differential across said bridge terminals whereby the power supplied to the respective thermistor and thus its temperature and corresponding resistance is varied and the voltage at the respective bridge terminal is varied to establish equilibrium in said bridge, and means for comparing electrical values in the two bridges for producing an output signal proportional to the difference in the cooling imposed upon the two thermistors.

2. A device in accordance with claim 1 wherein the means for comparing the voltage at the bridge terminals of each bridge and for controlling the voltage applied at the input of said bridge in response to a voltage differential across said bridge terminals comprises a control transistor having the emitter thereof connected to the bridge terminal in the bridge leg including said thermistor and having the base thereof connected to the other bridge terminal, and means connected to and responsive to the voltage at the collector of said control transistor for varying the input to said bridge.

3. A device in accordance with claim 2 wherein the last mentioned means comprises a power transistor having the base thereof connected to the collector of said control transistor and to a source of power, the collector of said power transistor being connected to a source of power and the emitter thereof being connected to the input terminal of the bridge.

PO-1050
(5/69)

UNITED STATES PATENT OFFICE
CERTIFICATE OF CORRECTION

Patent No. 3,597,676                    Dated   August 3, 1971

Inventor(s)                A. G. MOORE

It is certified that error appears in the above-identified patent and that said Letters Patent are hereby corrected as shown below:

Col. 1, line 58 of printed patent; page 3, line 15 of spec. -
    delete "at its" insert --. The--

Col. 1, line 58 of printed patent; page 3, line 16 of spec. -
    after "end" insert --of the nozzle 6 is positioned--

Col. 1, line 59 of printed patent; page 3, line 16 of spec. -
    delete ", the nozzle 6" insert --and--

Col. 2, line 18 of printed patent; page 4, line 14 of spec. -
    delete "close" insert --closed--

Col. 2, line 57 of printed patent; page 5, line 19 of spec. -
    delete "powers" insert --power--

Col. 2, line 59 of printed patent; page 5, line 21 of spec. -
    "On" should read --One--

Col. 4, line 9 of printed patent; page 8, line 14 of spec. -
    "77" should read --76--

Signed and sealed this 14th day of March 1972.

(SEAL)
Attest:

EDWARD M. FLETCHER, JR.                ROBERT GOTTSCHALK
Attesting Officer                      Commissioner of Patents